June 11, 1963  R. D. DONER  3,092,992
APPARATUS AND METHOD FOR TESTING SOLID PROPELLANT FOR AGING
Filed July 12, 1960  2 Sheets-Sheet 1

Ralph D. Doner,
INVENTOR.

BY S. J. Rotondi
A. J. Dupont
J. W. Voigt

June 11, 1963 R. D. DONER 3,092,992
APPARATUS AND METHOD FOR TESTING SOLID PROPELLANT FOR AGING
Filed July 12, 1960 2 Sheets-Sheet 2

Ralph D. Doner,
INVENTOR.

BY S. J. Rotondi
A. T. Dupont
J. W. Voigt

United States Patent Office 3,092,992
Patented June 11, 1963

3,092,992
APPARATUS AND METHOD FOR TESTING SOLID PROPELLANT FOR AGING
Ralph D. Doner, Huntsville, Ala., assignor to the United States of America as represented by the Secretary of the Army
Filed July 12, 1960, Ser. No. 42,448
7 Claims. (Cl. 73—19)
(Granted under Title 35, U.S. Code (1952), sec. 266)

The invention described herein may be manufactured and used by or for the Government for governmental purposes without the payment of any royalty thereon.

This invention relates to an apparatus and method for testing solid propellant for aging. Such an apparatus can be used to test laboratory samples of propellants, or solid propellant motors during shelf or service life.

Changes in the condition of the propellant are known, in the art, as aging and consists, primarily, of loss of potential energy of the propellant, of conditions developing in the motor that hinder or prevent normal conversion of potential energy into thrust and of cross-linking of the polymers. Some of the major symptoms indicating aging are: evolution of volatile gases, deposits of compounds within and/or on the surfaces of the propellant, loss of plasticity, elasticity, porosity or compressibility, formation of bubbles within the propellant or blisters on the surface, and crystallization, or glassy surface effects. The primary causes of these aging conditions are: time, temperature extremes, unbalanced mechanical forces, and unsaturated chemical bonds.

In the past, conditions of aging have been detected by using a set of chemically impregnated paper strips placed in the escape path of the gaseous by-products created by deterioration of the propellant, and by visual inspection of the motor.

In view of these facts, an object of this invention is to provide an apparatus for performing laboratory evaluation and calibration tests on solid propellants, for use in determining shelf or service life of the propellants.

Another object of the invention is to provide an apparatus for performing tests on solid propellant motors during shelf or service life of the motors.

A further object of the invention is to provide an apparatus for testing solid propellants, that provides the feature of protection of the propellant during the test period.

A still further object of the invention is to provide an apparatus for testing solid propellants, which can be easily removed from the stored propellants before they are used.

The foregoing and other objects of this invention will become more fully apparent from the accompanying drawings, in which.

Figure 2:
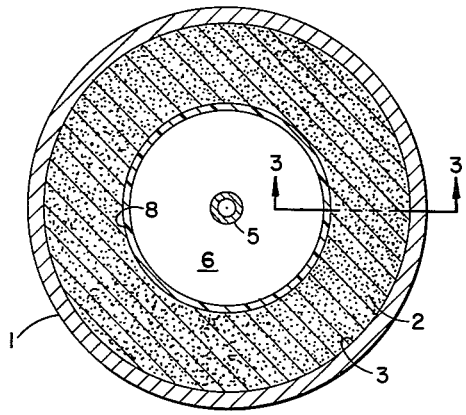
FIGURE 2 is a sectional view from the plane 2—2 of FIGURE 1.
Figure 3:
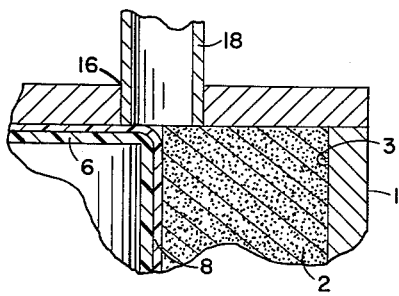
FIGURE 3 is an enlarged sectional view, from the plane 3—3 of FIGURE 2, showing the porous coating utilized for separating the propellant and liner.
Figure 1:
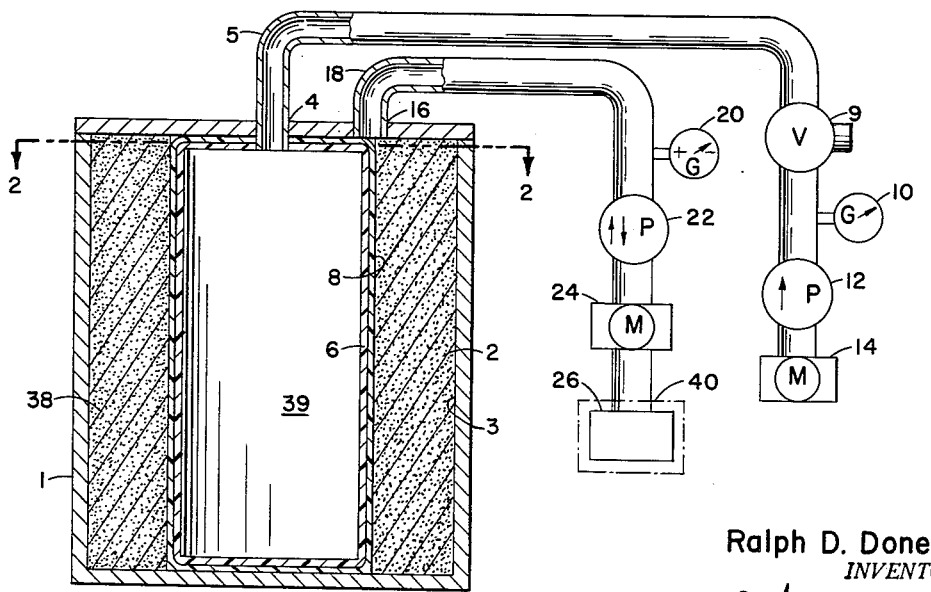
FIGURE 1 is a semidiagrammatic view, partly in section, of the laboratory version of the invention.

Referring more particularly to the drawings wherein like reference characters designate like or corresponding parts throughout the different views, the numeral 1, FIGURES 1-3, designates a pressure vessel of desired form. The vessel encloses a solid propellant 2, which is separated from the vessel by a bonding agent 3.

The propellant is hollow and can be of any internal shape. Vessel 1 is provided with an aperture 4, adjoining the hollow of said propellant, adapted to form an air-tight seal around one end of a tube 5. This end of tube 5 extends thru aperture 4 and is flow-connected to a resilient liner 6, which is impervious to air flow and which is covered with a porous coating 8. The other end of tube 5 is flow-connected with a three-way valve 9, a pressure gauge 10, a pump 12, which can be electrically or mechanically operated, and a meter 14 for measuring the volume of gas flowing thru tube 5, when tests are being made in the field, the mechanically operated pump would be normally used. The mechanical pump can be any of the known pressure controlled types, preferably the type using a spring, coupled to the pump piston, for supplying power to the pump. The liner is supplied with a shape which conforms with the shape of the hollow in propellant 2 and is confined in this hollow when in use. The porous coating is disposed in mating contact with the propellant to prevent wetting or sealing of the propellant surface by the liner. The vessel is also provided with a second aperture 16, which joins the inside of the vessel adjacent the joint of the coating, on the liner, and the propellant (FIGURE 3).

Aperture 16 has one end of a second tube 18 secured therein. The other end of tube 18 is flow-connected to a pressure gauge 20 with a plus and minus dial, a pump 22, which is preferably a two-way pump, that can be replaced by a single direction pump and which can be of the same type as pump 12 when used in the field, a two-way meter 24 for recording gaseous volume and a container 26 for receiving the gaseous fluid.

Figure 4:
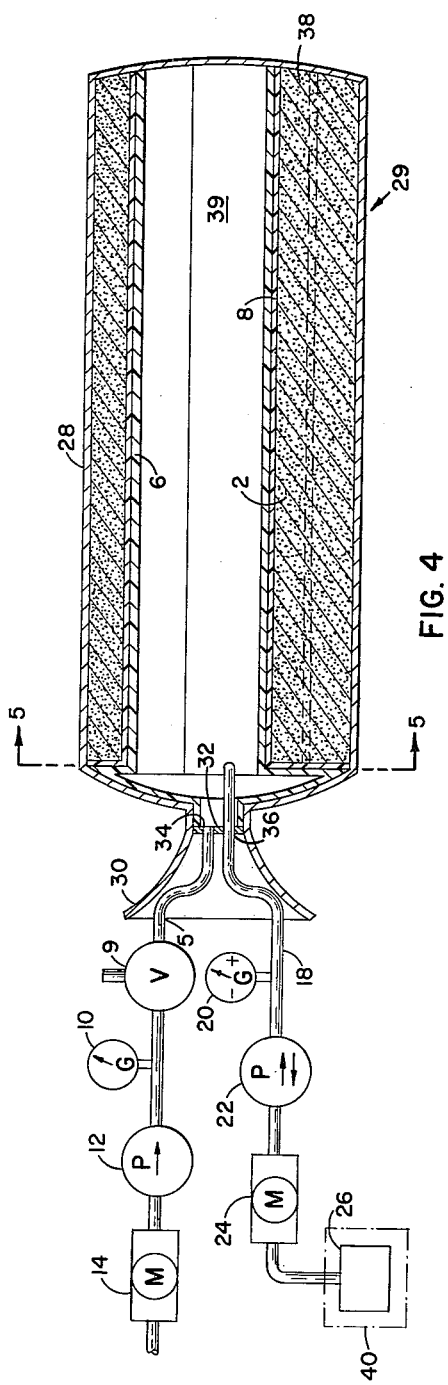
FIGURE 4 is a semidiagrammatic view, partly in section, of the shelf or service life, version of the invention.
Figure 5:
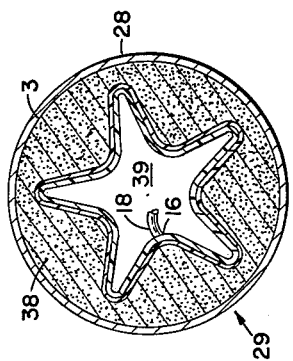
FIGURE 5 is a sectional view from the plane 5—5 of FIGURE 4, showing the relation between the liner and propellant.

In the form of the invention shown in FIGURES 4 and 5, pressure vessel 1 is replaced by the shell 28 of a rocket motor 29. The end of the motor that is provided with a nozzle 30 is sealed by a closure 32, which can be a separate plug or part of liner 6.

This closure contains apertures 34 and 36, which receives tubes 5 and 18. The tubes are flow-connected in the same manner as in FIGURES 1-3 (tube 5 to the inside of the liner and tube 18 between the liner and propellant).

The remainder of the elements are common to both forms and are indicated by the same reference numerals.

The operation of the invention is as follows:

A sample of the propellant to be tested is placed in a container (for this example, the laboratory form is used). The coated liner is positioned inside the propellant (or the liner can be placed on a mandrel and the propellant formed over the liner). The container is sealed and the pumps, gauges and meters are flow-connected as explained above.

With this arrangement of the invention completed, various tests can be applied to the propellant by operations which vary the pressures thru tubes 5 and 18. For example, by maintaining a lower pressure in region 38 than in region 39 (by use of pump 12, gauge 10 and meter 14 for maintaining one pressure and gauge 20, pump 22 and meter 24 for maintaining the other pressure at a constant differential from the first pressure), gases evolved by aging of the propellant will pass thru porous coating 8, thru line 18 and be collected in tank 26. This operation also provides protection of the propellant from slump, creep, contact with air and surface blisters. A second part of the operation would include the above procedure, except gauge 20, pump 22 and meter 24 would maintain a vacuum (depending on the density of the propellant) in region 38. This test would enable occluded gases in the propellant to be extracted. A third part of the operation would consist of replacing tank 26 with a gas supply 40, shown in dotted lines, such as helium or nitrogen, and increasing pressure in regions 38 and 39, by using pumps 12 and 22 to maintain pressure in region 39 higher than the pressure in region 38, until diffusion into the propellant stops. The gas is then extracted from the propellant by using the second operation. This operation allows the porosity of the propellant to be tested for an indication of aging (less gas can be diffused into the propellant as it ages). A fourth operation consists of opening region 38 to the atmosphere, increasing pressure in region 39 and relating the pressure in region 39 with the volume of gas, measured by meter 24, passing from region 38. This test gives an indication of compressibility of the propellant, which can be used as an index of deterioration caused by cross-linking of the polymers.

Although the laboratory version was used to explain the operation of the different tests possible with the invention it is to be understood that the same tests can be conducted with the field version of the invention. However, the field version is commonly utilized with the first operation and for protecting the propellant. The gases collected in this test can be compared with charts compiled from testing the laboratory version, for an indication of the amount of aging present in the propellant. When the propellant is ready for use, the liner is relieved of all pressure, by opening three-way valve 9 to the atmosphere, and removed from the aperture in the propellant.

It is to be understood that the preferred invention is herein shown and described, and that various changes in the shape, size and arrangement of parts may be resorted to without departing from the spirit of the invention, or the scope of the subjoined claims.

I claim:

1. Apparatus for testing solid propellant having a central aperture therein comprising: means for enclosing said propellant; a hollow resilient means secured in said aperture, having an outer surface adapted to conform with the wall surface of said aperture; a porous coating secured to said resilient means in engagement with said propellant and separating said resilient means from said propellant; a first tube having one end passing thru said means for enclosing said propellant and flow-connected with the hollow of said resilient means; a second tube having one end passing thru said means for enclosing said resilient means and flow-connected adjacent said engagement of said coating and propellant; means flow-connected to the other end of said first-named tube, for controlling fluid pressure in the hollow of said resilient means; means flow-connected to the other end of said second-named tube, for controlling fluid pressure around the engagement of said resilient means, said coating and said propellant; a collection tank flow-connected to said last-named means for controlling fluid pressure, whereby a pressure differential can be created in said means for enclosing said propellant, by proper adjustment of said means for controlling fluid pressure, enabling gases created by aging of the propellant to be evolved into said collection tank.

2. An apparatus as set forth in claim 1, in which said means for enclosing said propellant comprises the shell of the combustion chamber of a rocket engine.

3. An apparatus as set forth in claim 1, in which said first-named means for controlling fluid pressure comprises a three-way valve, a pressure gauge, a fluid pressure pump and a volumetric meter.

4. An apparatus as set forth in claim 1, in which said second-named means for controlling fluid pressure comprises a pressure gauge, a two-way pump and a volumetric meter.

5. The method of testing solid propellant, having a central aperture, for aging comprising: the step of placing the propellant in a container; positioning a liner having a porous coating in said aperture, with said coating engaging said propellant; supplying controlled fluid pressure to the inside of said liner; pressurizing the inside of liner to a predetermined level until the inside of said liner contains more pressure than the pressure around the outside of said liner; maintaining the difference in pressure over a period of storage of said propellant for evolution of gases therefrom; collecting said evolved gases; analyzing the collected gases to determine the extent of aging of the propellant.

6. The method of testing solid propellants, having a central aperture, for aging comprising: the steps of placing the propellant in a container; positioning a liner having a porous coating in said aperture, with said coating engaging said propellant; supplying controlled fluid pressure to the inside of said liner; supplying controlled fluid pressure externally of said liner; flowing a gas into said container externally of said liner; maintaining a higher pressure in said liner than around said liner, until the pores of said propellant are saturated with gas from said supply; analyzing the gas consumption for the amount of aging of the propellant.

7. The method of testing solid propellant, having a central aperture, for aging comprising: the step of placing the propellant in a container; positioning a liner having a porous coating in said aperture, with said coating engaging said propellant; flow-connecting one end of a tube internally of said liner; flow-connecting means for supplying controlled fluid pressure to the remainder of said tube; flow-connecting one end of a second tube externally of said liner, adjacent said engagement of said coating and said propellant; flow connecting a second means for supplying controlled fluid pressure intermediate the ends of said second tube; operating the means for supplying pressure until the inside of said liner contains more pressure than the pressure around the outside of said liner and the propellant becomes compressed; determining the amount the propellant is compressed, by the amount of fluid exhausted for an indication of the aging.

References Cited in the file of this patent

UNITED STATES PATENTS

| | | |
|---|---|---|
| 2,345,935 | Hassler | Apr. 4, 1944 |
| 2,531,083 | Smith | Nov. 21, 1950 |
| 2,705,418 | Reichertz | Apr. 5, 1955 |